March 12, 1940.  E. L. SHEPARD  2,192,937
PULP MOLDING DIE
Filed Aug. 24, 1938  2 Sheets-Sheet 1

INVENTOR.
Ernest L. Shepard
BY Spear Rawlings & Spear
ATTORNEYS.

March 12, 1940.  E. L. SHEPARD  2,192,937
PULP MOLDING DIE
Filed Aug. 24, 1938   2 Sheets-Sheet 2

INVENTOR.
Ernest L. Shepard
BY Spear Rawlings & Spear
ATTORNEYS.

Patented Mar. 12, 1940

2,192,937

UNITED STATES PATENT OFFICE 2,192,937

PULP MOLDING DIE

Ernest L. Shepard, Fairfield, Maine, assignor, by mesne assignments, to The Canal National Bank of Portland, Portland, Maine, a national banking association, as trustee Application August 24, 1938, Serial No. 226,507

2 Claims. (Cl. 92—54)

This invention relates to pulp molding dies of the type which are provided with a mesh wire covered drainage surface, and to the method of making such dies.

The die of my present invention is especially designed for the manufacture of a relatively large, flat article, such as one with a surface contour comprising a series of alternating upwardly and downwardly extending posts with steep side wall angles and relatively sharp corners, as for example, the combination flat and filler shown in the Kronenberger Patent No. 1,956,955, of May 1, 1934.

For articles which have such large area and irregular contour it is difficult, if not impossible, to draw or shape a single piece mesh wire to fit the entire working surface of the molding die without either breaking or distorting the mesh to such an extent as to change its drainage characteristic and cause mechanical weaknesses at certain sections of its area. To avoid these difficulties such articles have heretofore been manufactured on dies which do not require a woven wire covering on its working surface, such as a laminated die.

The die of my present invention has a sectional molding surface. The woven wire covering is made up of pieces conforming in contour and size to each mold section. In the assembled die the wire sections are held securely to the working surface of the mold sections by clamping the marginal edges of the wire sections between abutting edges of the mold sections.

The advantages of my die over other types of dies used for the manufacture of similar articles are many. Considering it in comparison with a laminated type die, the advantages are reduction in finished die weight, lower manufacturing cost and longer life with lower maintenance. In the accompanying drawings.

Figure 1:
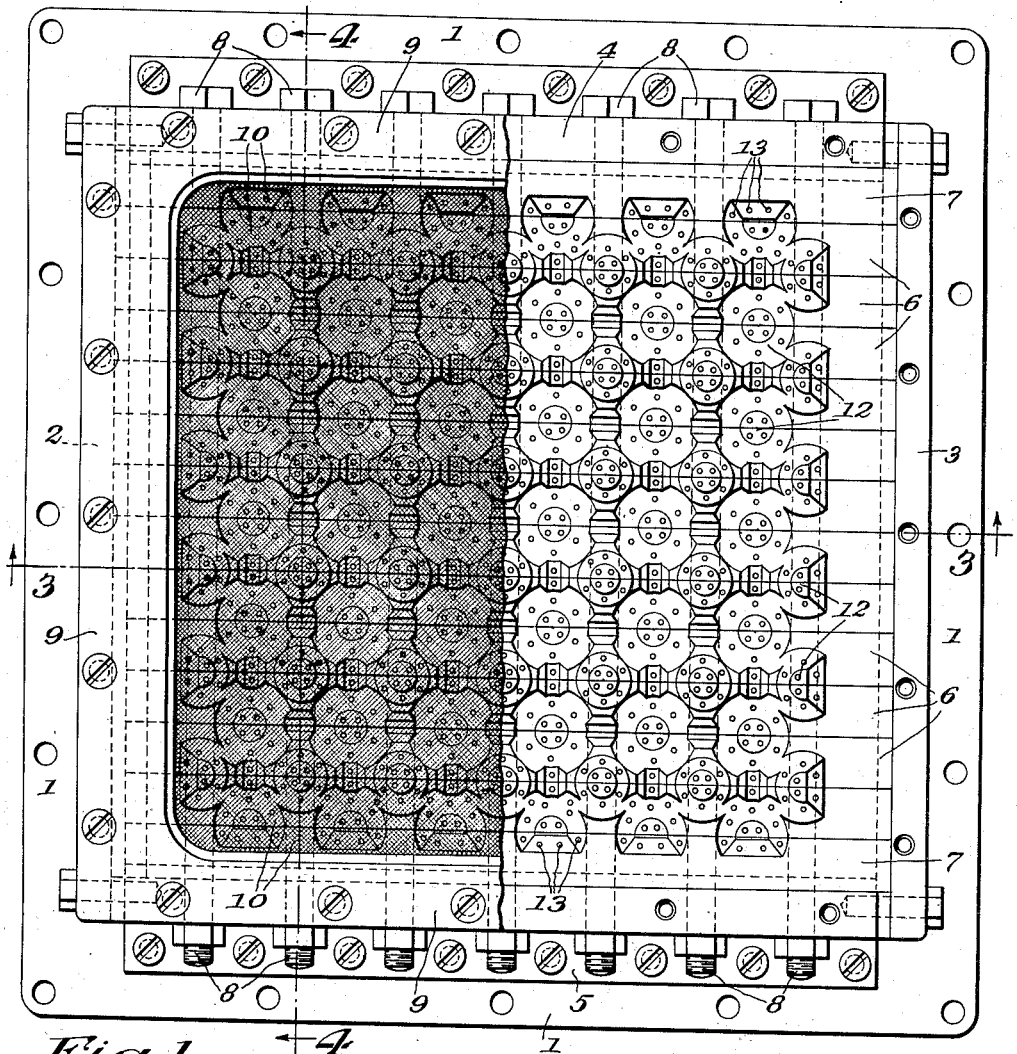
Fig. 1 is a top plan view, partly broken away, of a die in accordance with my invention.
Figure 2:
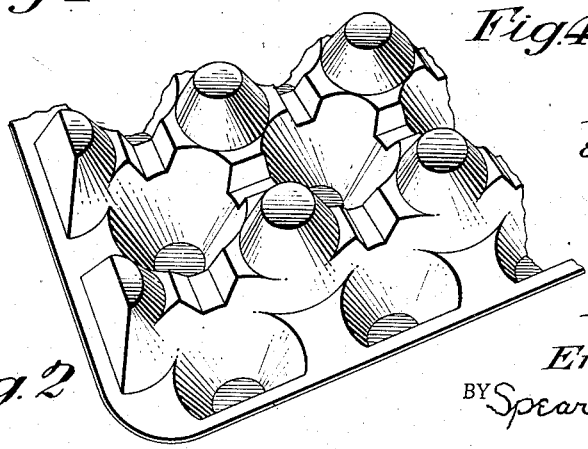
Fig. 2 is a fragmentary perspective view of a molded pulp article of the type which may be produced by my die.
Figure 4A:
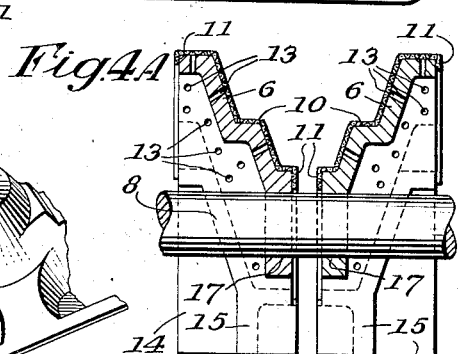
Figure 3:
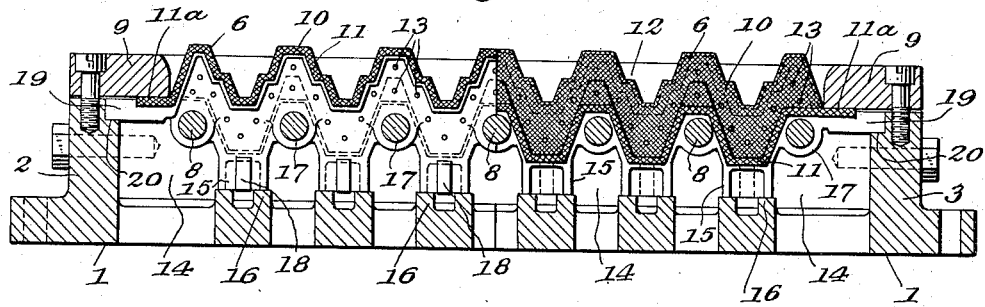
Figure 4:
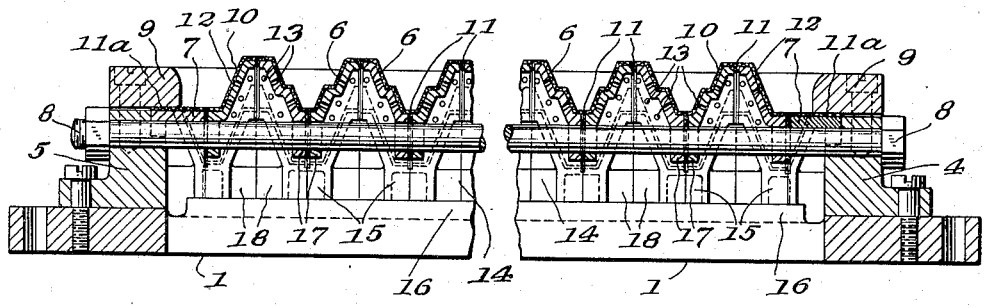

Figs. 3 and 4 are cross sections on the line 3—3 and 4—4, respectively, of Fig. 1.

Fig. 4A is a fragmentary enlargement of Fig. 4 particularly showing the extended edges of the wire coverings which are clamped between abutting edges of adjacent mold sections, the mold sections being spread apart as when the wire coverings are to be repaired or replaced.

Figure 5:
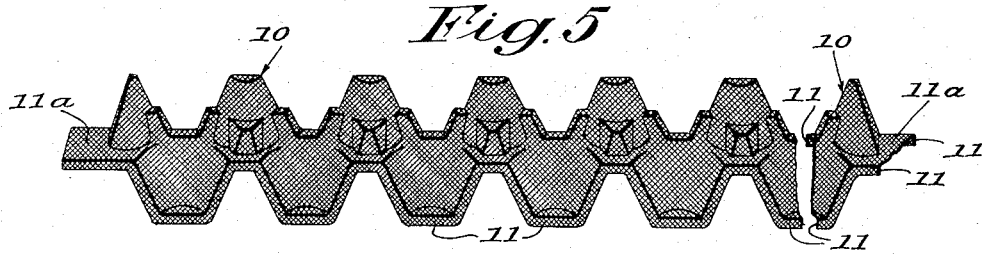
Figure 6:
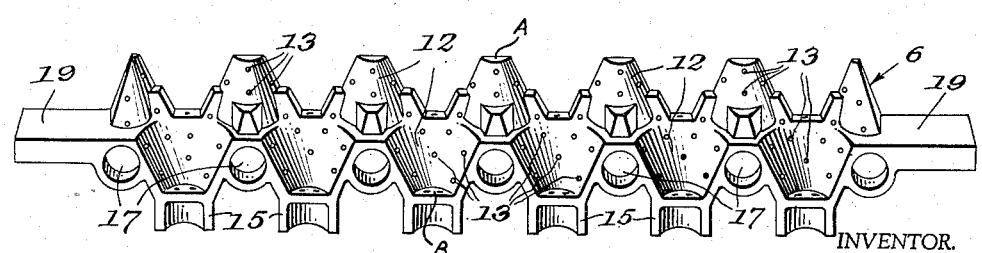

Fig. 5 is a perspective view of one of the wire coverings for a mold section removed from the die, and Fig. 6 is a similar view of the mold section which is to be covered by said wire section.

The die body or frame comprises the bottom plate 1, adapted for attachment to a die carrier on a pulp molding machine, two oppositely disposed spaced side walls 2 and 3 and two oppositely disposed spaced end plates 4 and 5.

The side walls 2 and 3 are preferably integral with the bottom plate and act as partial supports and guides for the mold sections 6 and 7 of the die.

The end plates 4 and 5 are bolted in place on the die frame by any suitable bolts or the like. If desired, one of said end plates, here shown as plate 4, may be an integral part of the frame 1. The opposite plate 5 is a removable clamping member.

The mold sections 6 and 7 are clamped in edgewise abutment between the end plates 4 and 5 by means of clamping bolts 8, and the overlying clamping ring 9, which defines the edge of the molded article, and as shown also serves to hold the clamped mold sections securely within the assembled frame.

Each mold section 6 and 7 is covered by a wire mesh covering 10 which is preformed to fit the mold section which it is to cover. Each wire mesh covering conforms in size and contour to the size and contour of the working surface of the mold section which it covers. The longitudinal edges of each wire section are extended as at 11 sufficiently to permit them to be clamped between the abutting edges of two adjacent mold sections. Each end of the wire mesh covering is extended as at 11a sufficiently to permit said ends to be clamped between the ring 9 and the mold section which is covered by said wire covering. As shown in Fig. 6, the design is such that one abutting edge of each mold section and one turned-down marginal portion of its covering intersects substantially the highest plane of the die indicated at A, in that area of the die in which such mold section is located and the other abutting edge of each mold section and the other turned-down marginal portion of its covering intersects substantially the lowest plane of the die indicated at B in that area of the die in which such mold section is located. The breaking up of the contour of the die into sections in this manner permits easy forming of a fitting wire mesh covering for each mold section (see Fig. 5) due to the fact that each wire mesh covering may be conformed to its mold section with the minimum "drawing" or distortion.

To place the wire mesh coverings, or to replace the same, it is only necessary to remove the ring 9, loosen the clamp bolts 8 and loosen the clamp member 5 from the frame 1.

The sections making up the mold surface may then be spread apart as desired and the wire coverings added to or taken from the mold sections as required. After the wire coverings are in place, the clamp piece 5 is replaced in its assembled position, once again clamping the mold sections with their wire coverings securely in place, and the ring 9 added completing the die assembly.

For the purposes of this application, all of the mold sections making up the working surface of the die, except the two end mold sections, may be considered duplicates of one another.

Fig. 6 is a detail view of one of the intermediate mold sections 6 of my die. The contoured surface 12 is the working surface and is covered by the mesh wire covering 10 detailed in Fig. 5. Said working surface is provided with drainage holes 13 through which the water of formation passing through the mesh wire covering is drained into the vacuum chamber 14 underneath the assembled mold sections.

Each mold section may be provided with reinforcing posts 15 resting on supports 16 which may be a part of the die frame. The clamping bolts 8 pass through holes 17 in the mold sections and the mold sections are provided with lugs 18 adapted for clamping abutment with similar lugs on an adjacent mold section. The ends of the mold sections are extended as at 19 to laterally position the mold sections with reference to each other and to the die frame and these extensions may be made to fit in milled grooves 20 in the side walls of the die frame (see Fig. 3). The end mold sections 7 are generally similar to the intermediate mold sections except for differences in contour.

Preferably, in constructing my die all parts making up the die are separately finished except for the finishing of the contour of the working surface of the mold sections. The die is then assembled, as heretofore described, except for applying the woven wire coverings over the mold sections, and shims, substantially equal to the thickness of the abutting longitudinal edges of the wire coverings, are inserted between the mold sections in lieu of the wire coverings and are clamped between the wire clamping longitudinal edges of the mold sections.

In this assembled condition, the die is ready to have the final contour of the working surface of the mold sections finished. This may be done in any suitable manner, as for instance on a die sinking machine from a master of the required shape. After finishing the contour of the mold sections, the drainage holes 13 may be drilled, after which the shims are removed and the wire coverings assembled on the molding surface as heretofore described.

If desired, the shims may be omitted in the above die assembly, and the contour finished as required and then disassembling the mold sections from the die and relieving the wire-clamping abutting edges of each mold section an amount approximately equal to the thickness of the extended edges 11 of the wire coverings.

While I have described the mold sections as being machine finished, it will be apparent to one skilled in the art that mold sections, such as shown in Fig. 6 may be die-cast or with slight modifications in design formed from sheet stock where a sufficient number of similar sections are wanted to warrant the expense of this practice.

While I have shown and described the coverings for the mold sections as made of woven wire, it will be understood that this may be any other suitable material, such as thin perforate metal.

Various modifications in the die and method of making the same may be resorted to without departing from the spirit of the invention, if within the limit of the appended claims.

What I therefore claim and desire to secure by Letters Patent is:

1. A pulp molding die for the suction formation of a molded fibrous pulp article, said die having an irregularly contoured molding surface comprised by a plurality of abutting mold sections with individual perforate coverings conforming to said sections, each covering having turned down marginal portions extending between the abutting edges of the mold sections so as to be anchored thereby when the mold sections are in clamped assembly, one abutting edge of each mold section and one turned-down marginal portion of its covering intersecting substantially the highest plane of the die in that area of the die in which such mold section is located and the other abutting edge of each mold section and the other turned-down marginal portion of its covering intersecting substantially the lowest plane of the die in that area of the die in which such mold section is located so that the coverings may be shaped to conform to the mold sections with the minimum of drawing or distortion, and means for clamping the assembly of mold sections and coverings in the relationship specified.

2. A die for molding fibrous pulp comprising a base plate having spaced side walls and spaced end walls, a plurality of irregularly contoured mold sections disposed in side to side relationship between said end walls, means to releasably clamp the mold sections together between said end walls, the two outermost mold sections having flat-top outer side portions flush with the top surface of said end walls and flat-top end portions flush with the top surface of said side walls, the intermediate mold sections having flat-top end portions flush with the top surface of said side walls, all of said mold sections being supported and positioned by said base plate and side walls, a preformed perforate covering individual to each mold section correspondingly contoured thereto and fitting thereover, the coverings of the two outermost mold sections having flat outer side portions overlying the flat-top outer side portions of said mold sections, flat end portions overlying the flat-top end portions of said mold sections, and inner marginal portions overlying the inner side faces of said mold sections, the coverings of the intermediate mold sections having turned down marginal portions overlying the sides of their related mold sections and flat end portions overlying the flat-top end portions of their related mold sections, the turned down marginal portions of said coverings being clamped together between said mold sections, one abutting edge of each mold section and one turned-down marginal portion of its covering intersecting substantially the highest plane of the die in that area of the die in which such mold section is located and the other abutting edge of each mold section and the other turned-down marginal portion of its covering intersecting substantially the lowest plane of the die in that area of the die in which such mold section is located, and means superimposed upon the flat side and end portions of said coverings and clamping them against the underlying portions of the mold sections and defining the side and end limits of the pulp molding area of the die.

ERNEST L. SHEPARD.